UNITED STATES PATENT OFFICE.

HUGH C. SICARD, OF BUFFALO, NEW YORK, ASSIGNOR TO UNITED STATES FERRO-ALLOYS CORPORATION, OF NEW YORK, N. Y., A CORPORATION OF NEW YORK.

PROCESS FOR PRODUCING ZIRCONIUM STEEL.

1,335,992.   Specification of Letters Patent.   Patented Apr. 6, 1920.

No Drawing.   Application filed August 18, 1919.   Serial No. 318,330.

*To all whom it may concern:*

Be it known that I, HUGH C. SICARD, a citizen of the United States of America, and a resident of the city of Buffalo, county of Erie, and State of New York, have invented certain new and useful Improvements in Processes for Producing Zirconium Steel, of which the following is a full, clear, and exact description.

This invention relates generally to the manufacture of zirconium steel, that is, a steel containing various proportions of zirconium.

More particularly, this invention relates to a process of adding ferro-zirconium to steel and consists in a novel method whereby the process of manufacture can be carried on with much greater ease and with more certainty of obtaining the quality of steel desired than has heretofore been possible.

It is generally recognized by the art that in making zirconium steel, great difficulty is experienced in obtaining the desired quality of product owing to the fact that some of the added zirconium is lost by oxidation. A close examination of the product obtained under the prior methods of making zirconium steel shows that this oxidation of the zirconium is caused by a reaction between the oxids contained in the steel and those contained in the zirconium. This, I have found, will happen even if the bath of molten steel has been previously treated by the addition of a deoxidizer such, for instance, as a 50% addition of ferro-silicon.

At present, the general practice of the art when making zirconium steel is to add ferro-zirconium to the molten metal. Owing to the fact that some of the zirconium thus added is oxidized when the ferro-zirconium is mixed with the steel, it is very difficult to get out a product of predetermined composition.

In carrying out my invention, I use a ferro-zirconium-titanium alloy which is really a complex carbid of zirconium, iron and titanium. Titanium having a very strong affinity for oxygen, the oxids contained in the steel react with it more readily than does the zirconium and thus the greater part of the zirconium alloys with the steel instead of reacting with the oxids thus protecting the zirconium and allowing the steel manufacturer to get a better and more accurate yield in his zirconium addition.

Having thus described my invention, what I claim is:

1. An improved process of making zirconium steel which consists in adding to molten steel an alloy of iron, zirconium, titanium and carbon.

2. An improved method of adding zirconium to steel which consists in adding to molten steel a complex carbid of zirconium, iron and titanium.

3. An improved method of making zirconium steel which consists in adding to molten steel a ferro-zirconium-titanium alloy combined with carbon.

In testimony whereof, I have hereunto signed my name.

HUGH C. SICARD.